May 2, 1950      W. G. NEILD      2,506,234
ELECTRIC REGULATOR
Filed July 17, 1946      2 Sheets-Sheet 1
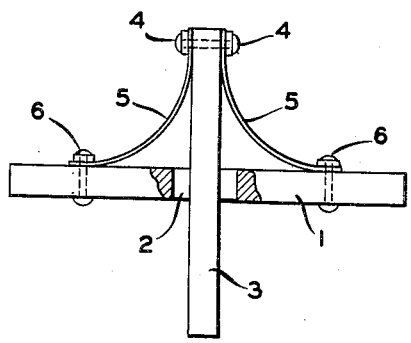
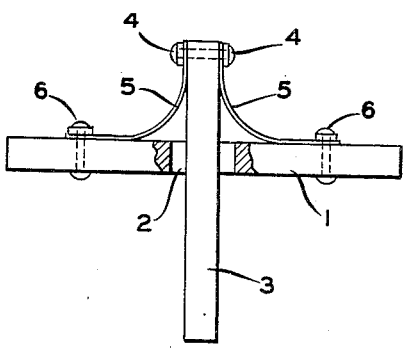
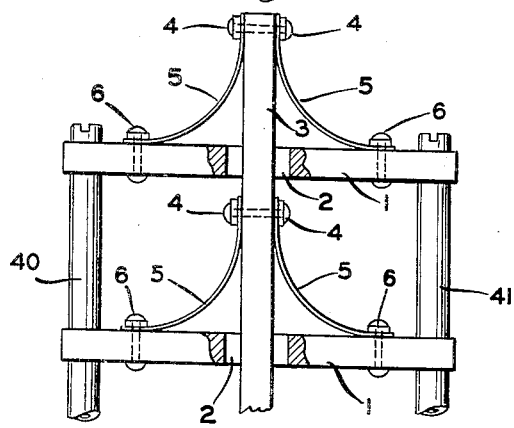
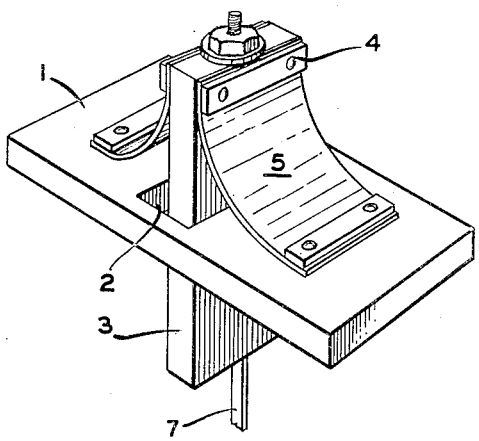
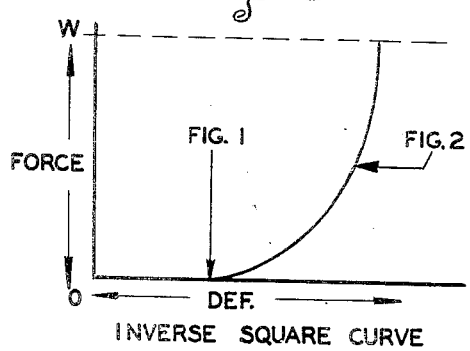
INVERSE SQUARE CURVE
—INVENTOR—
WILLIAM G. NEILD
BY
—ATTORNEY—

May 2, 1950 W. G. NEILD 2,506,234
ELECTRIC REGULATOR
Filed July 17, 1946 2 Sheets-Sheet 2

-INVENTOR-
WILLIAM G. NEILD

BY
-ATTORNEY-

Patented May 2, 1950

2,506,234

UNITED STATES PATENT OFFICE 2,506,234

ELECTRIC REGULATOR

William G. Neild, Warren Point, N. J., assignor to Bendix Aviation Corporation, Teterboro, N. J., a corporation of Delaware Application July 17, 1946, Serial No. 684,379

5 Claims. (Cl. 201—51)

The present invention relates to a novel spring means and more particularly to a novel bent spring blade arrangement.

An object of the invention is to provide a novel spring mechanism in which the stiffness of the spring increases very rapidly with deflection.

Another object of the invention is to provide a novel spring mechanism having vibration damping characteristics and a rolling non-slipping action as near frictionless as possible.

Another object of the invention is to provide a spring mechanism having the above characteristics and particularly adapted for use as an armature spring in a carbon pile regulator of the type including an electromagnet which applies a force to the armature continuously increasing in excess of a linear relation as the armature approaches the electromagnet and which force varies approximately inversely as the square of the distance between the armature and magnet and in which the opposing armature spring is arranged to compensate for the magnet's varying force.

Another object of the invention is to provide a novel spring mechanism having a force deflection curve which very closely resembles an inverse square curve and particularly adapted for use as a shock mount in which the inverse square curve with its ever changing resonant frequency with deflection gives to the shock mount its stability in that there is a limited amplitude at any frequency of vibration.

Another object of the invention is to provide a novel metal spring shock mount in which the stiffness of the spring increases strongly with amplitude so as to keep the amplitude for any frequency of vibration low.

Another object of the invention is to provide a metal spring blade shock mount which is not adversely affected by either oil or low ambient temperatures as are rubber or other plastic shock mounts.

These and other objects and features of the invention are pointed out in the following description in terms of the embodiment thereof which is shown in the accompanying drawing. It is to be understood, however, that the drawings are for the purpose of illustration only, and are not designed as a definition of the limits of the invention, reference being had to the appended claims for this purpose.

In the drawings:

Figure 1 is a side view of one form of the novel spring mechanism with a part broken away to better illustrate the same.

Figure 2 is a side view of the spring mechanism of Figure 1 in a deflected position and showing the bent metal spring blade members clamped to a horizontal and a vertical supporting member and wrapping down the vertical supporting member and in toward the center of the horizontal member so as to decrease the radius on which the spring blades are curved and greatly increase the resistance of the spring blade as force is applied to the supporting member.

Figure 3 is a perspective view of the spring mechanism of Figures 1 and 2 and showing the same in assembled relation.

Figure 4 is a side view of a modified form of the invention with certain parts broken away to better illustrate the operation thereof.

Figure 5 is a graphical illustration of the inverse square curve effected through the spring mechanism of Figures 1 through 3.

Figure 6:
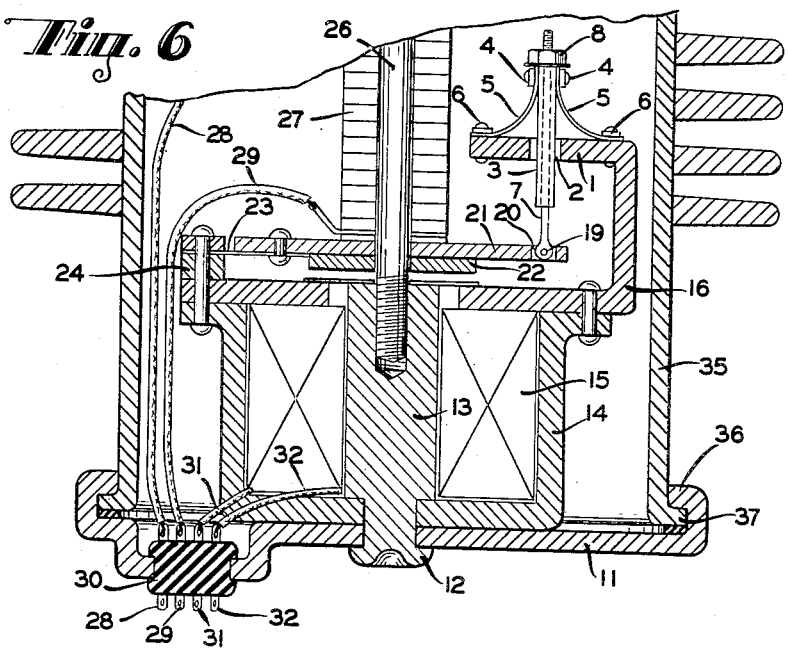
Figure 6 is a fragmentary sectional view of a carbon pile regulator in which there is applied the novel spring mechanism of Figures 1 through 3 as an armature spring.

Referring to the drawing, Figures 1, 2 and 3 illustrate one form of the invention in which there is provided a horizontal supporting member 1 having an opening 2 formed therein. Movably mounted in the opening 2 and extending at a ninety degree angle to the supporting member 1 is a vertically extending member 3 to one side of which there is riveted at 4 one end of a curved metal spring blade 5. The other end of the spring blade 5 is riveted at 6 to the horizontal supporting member 1. At the opposite side of the vertical member 3 a similar curved metal spring blade 5 is positioned, like numerals indicating like parts.

An actuating member or stem 7, as shown in Figure 3, may extend longitudinally through the vertical member 3 and may be fastened at its upper end to the member 3 by a suitable adjustment nut 8.

In operation, it will be seen that upon a downward force being applied at the member 3 the spring blade 5 will tend to wrap or roll on the surface of the horizontal member 1 as the member 3 moves downward. Such action will decrease the radius of the springs 5 and greatly increase their resistance to force so as to provide a force deflection curve which very closely resembles an inverse square curve and a rolling non-slipping action with a minimum friction, A typical curve, effected by the spring mechanism is illustrated graphically at Figure 5.

Figure 7:
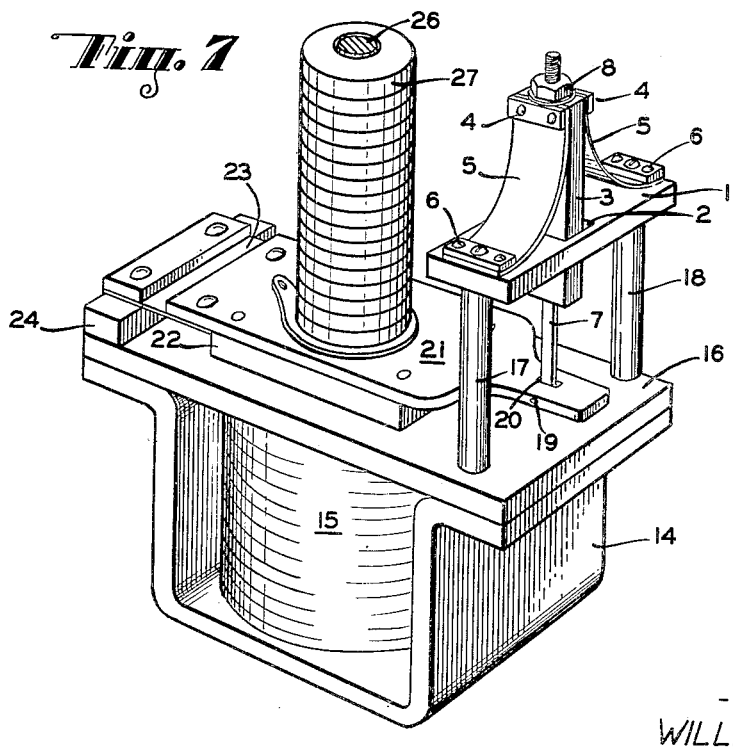
Figure 7 is a perspective view of the novel spring mechanism as applied to the armature assembly of a carbon pile regulator.

The spring mechanism of Figures 1–3 is particularly adapted for use as an armature spring in a carbon pile regulator, as shown in Figures 6 and 7.

The regulator may be of a type such as shown and described in the copending application Ser. No. 644,801, filed February 1, 1946, by William G. Neild, now Patent No. 2,496,743, issued February 7, 1950.

The regulator as shown in Figure 6 may include a base plate 11 having riveted thereto at 12 an electromagnet core 13. The core 13 is positioned within an electromagnet case 14 formed of a suitable ferro-magnetic material and wound about the core 13 is an electromagnetic winding 15.

Fastened to the upper end of the case 14 is a top plate 16 which as shown in Figure 6, may be curved so as to form a horizontal supporting member, which corresponds to the supporting member 1 previously described with reference to the spring mechanism of Figures 1–3, or the supporting member 1 may be mounted as indicated in Figure 7 by posts 17 and 18 which project from the top plate 16.

In the spring mechanism illustrated in Figures 6 and 7 like numerals indicate like parts to those previously described, with reference to Figures 1–3.

In the arrangement of Figures 6 and 7, the spring actuating member 7 is connected by a pin 19 in a slot 20 formed in one end of an armature plate 21.

There is riveted to the plate 21 an armature member 22 and at the other end of the armature plate 21 there is provided a flexible metal hinge 23 which has one end riveted to the armature plate 21, and the other end riveted to a bar 24 which projects from the top plate 16.

There is screw threadedly engaged in the core 13 a rod 26 which projects from the core 13 and through suitable openings formed in the armature 22 and plate 21. The armature 22 and plate 21 are freely mounted on the rod 26.

The rod 26 may be formed of suitable material such as Invar, and in its preparation the same is suitably insulated by being dipped in vitreous enamel-baked and then processed in a centerless grinder as is well known in the art.

Slidably mounted on the insulated rod 26 are a series of carbon discs 27 arranged so as to form a carbon pile having a lower end bearing upon the armature plate 21, while the opposite or upper end is held by suitable fastening means carried by the rod 26, as shown in greater detail in the aforenoted copending application.

An electrical conductor 28 leads from the upper end of the carbon pile 27, while an electrical conductor 29 leads from the lower end of the carbon pile 27. The electrical conductors 28 and 29 lead to an insulated terminal board 30 welded in the base plate 11.

Conductors 31 and 32 also lead from the terminal board 30 to an electromagnetic winding 15. The conductors 28, 29, 31 and 32 extend through the base board 30 for suitable external connection.

The entire regulator thus described may be assembled in a suitable can-like container or housing indicated by numeral 35 and the outer edge 36 of the base plate 11 may be rolled over a flanged portion 37 of the can-like container 35.

In the operation of the spring mechanism in the arrangement shown in Figures 6 and 7 it will be seen that as the armature 22 is drawn down toward the electromagnetic core 13 the spring blades 5 will roll or wrap down the vertical member 3 and in toward the center on the horizontal member 1 and thereby decreasing the radius of the curve on which the spring blades 5 are bent and increase the resistance of the springs 5 to the magnetic force so as to effect basic correspondence with the non-linear force characteristic of the electromagnet 15.

In the latter arrangement, the nut 8 may be adjusted so as to vary the tension of the springs 5 and thereby match the deflection curve of the springs 5 with that of the electromagnet 15. This mode of adjustment permits the core 13 to be riveted in place and a wide variation of tolerances in the spring parts.

In Figure 4 there is shown a modified form of the invention in which posts 40 and 41 may be provided for supporting a pair of horizontal supporting members 1 through which extend the vertically movable member 3. Spring blade members 5 are operatively connected to members 1 and 3 as previously described with reference to Figures 1–3 in which like numerals indicate like parts.

In the arrangement of Figure 4, the spring blade members 5 jointly cooperate in opposing movement of the member 3 downward in like manner to that previously described with references to Figures 1–3. Any desired number of spring mechanisms may be arranged as indicated in Figure 4 to oppose movement of the member 3 relative to the member 1 and the operation thereof will be readily apparent when considered in the light of the previous description of Figures 1–3.

The spring mechanisms shown in Figures 1 through 4 also provide a convenient means for shock mounting a unit which may be connected through the movable member 3 to the spring mechanisms and thereby suspended from three or more of the spring mechanisms in place of the conventional rubber shock mounts heretofore employed and well known in the art. A plurality of such spring mechanisms may be connected at one side or to opposite sides of the unit as may be desired. In such an arrangement it will be seen that the stiffness of the spring members 5 increases strongly with deflection of the member 3 so as to effect a limited amplitude at any frequency of vibration due to the ever changing resonant frequency of the spring member 5 which results upon deflection.

Although only two embodiments of the invention have been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. The combination comprising, a first member, a second member, one of said members having an opening therein and the other of said members extending through said opening at substantially a ninety degree angle to said one member and movably mounted in relation thereto, curved spring blades connected at opposite ends thereof to said members and curved inwardly toward said members so as to wrap thereupon as the spring blades are stressed to decrease the radius of the curved blades and increase the resistance of the spring blades upon relative movement of said members in one sense.

2. The combination comprising, a first member, a second member, the second member movably mounted relative to said first member, a pair of curved spring blades mounted at opposite sides of said second member and each of said spring blades fastened at opposite ends thereof to said first and second members, said curved blades at said opposite ends extending contiguous to said first and second members and curved inwardly toward said members so that upon movement of said second member in one sense tending to stress said curved blades the blades wrap upon said first and second members so as to decrease the radius of the curved blades and continuously increase the resistance of the curved spring blades in excess of a linear relation to movement of said second member in said one sense.

3. The combination comprising, a plurality of supporting members, another member movably mounted relative to said supporting members, a plurality of pairs of curved spring blades, each of said pairs of curved spring blades fastened to one of said supporting members, the spring blades of each pair being mounted at opposite sides of said movable member, each of said curved spring blades being curved inwardly toward its associated supporting member and movable member so that upon movement of said movable member in one sense tending to stress said curved blades each of the blades wrap upon its associated supporting member and said movable member so as to decrease the radius of the curved blades and continuously increase the resistance of the curved spring blades in excess of a linear relation to movement of said movable member in said one sense.

4. For use in an electrical regulator of the type including a variable electrical resistance means, an electromagnet, an armature movably mounted in relation to said electromagnet, means connecting the armature to the variable electrical resistance means, said electromagnet biasing said armature in a direction for changing the electrical resistance of said variable electrical resistance means; a spring mechanism comprising, in combination, a supporting member, a movable member for operative connection to said armature and extending at a substantially ninety degree angle to said supporting member, curved spring blades connected at opposite ends thereof to said members and extending inwardly toward said members so that upon movement of said armature toward said electromagnet said curved spring blades wrap upon said supporting member and said movable member so as to decrease the radius of the curved blades and progressively increase the resistance of the spring blades to displacement of said armature by said electromagnet.

5. For use in an electrical regulator of the type including a variable electrical resistance means, an electromagnet, an armature movably mounted in relation to said electromagnet, means connecting the armature to the variable electrical resistance means, said electromagnet biasing said armature in a direction for increasing the electrical resistance of said variable electrical resistance means; a spring mechanism comprising, in combination, a supporting member, a movable member, a stem extending longitudinally through said movable member for operative connection at one end to said armature and at the other end to said movable member, said movable member extending at a substantially ninety degree angle to said supporting member, curved spring blades connected at opposite ends thereof to said members, said spring blades being curved inwardly toward said members so that upon movement of said armature toward said electromagnet said curved spring blades wrap upon said supporting member and said movable member so as to decrease the radius of the curved blades and progressively increase the resistance of the spring blades to displacement of said armature by said electromagnet, and means for adjusting said stem relative to said movable member so as to match the deflection force of the spring blades with that of the electromagnet.

WILLIAM G. NEILD.

REFERENCES CITED

The following references are of record in the file of this patent:

UNITED STATES PATENTS

| Number | Name | Date |
|---|---|---|
| 74,973 | Ayres | Mar. 3, 1868 |
| 2,043,953 | Harrall et al. | June 9, 1936 |
| 2,268,718 | Newton | Jan. 6, 1942 |
| 2,296,213 | Kretzschmar | Sept. 15, 1942 |
| 2,405,514 | Neild | Aug. 6, 1946 |

FOREIGN PATENTS

| Number | Country | Date |
|---|---|---|
| 472,251 | Great Britain | Sept. 15, 1937 |